United States Patent Office 3,088,554
Patented May 7, 1963

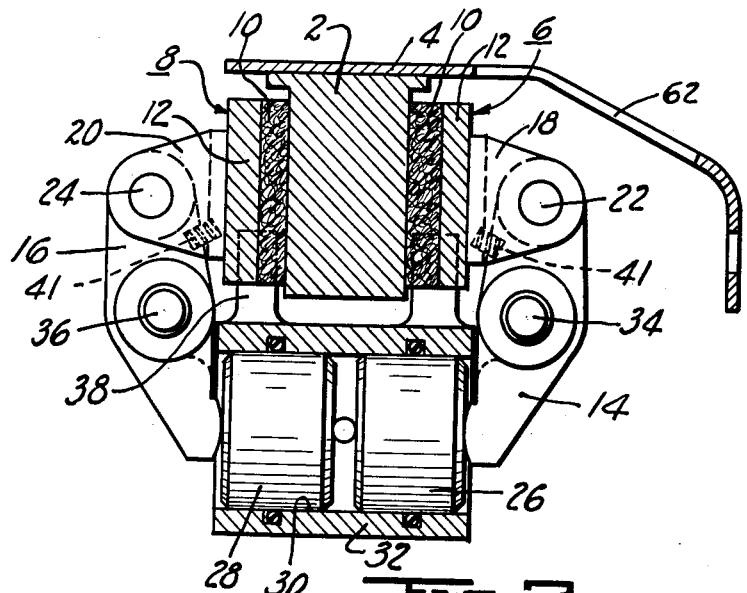

3,088,554
DISC BRAKE
Jean Lucien Desvignes, Viroflay, and Pierre Gancel, Levallois, France, assignors to The Bendix Corporation, a corporation of Delaware
Filed Mar. 20, 1958, Ser. No. 722,757
10 Claims. (Cl. 188—73)

The invention relates to a disc brake and, more particularly, to a disc brake of the type in which friction pads are adapted to be urged into engagement with opposite faces of a rotating disc fixed against axial movement.

It is an object of the invention to provide a disc brake of the above type in which the shifting thrust exerted by the disc on the friction pads is taken by anchoring lugs directly secured to the brake support, so that no tangential force is transmitted to the applying mechanism.

It is another object to provide a disc brake having two independent applying mechanisms, one of which is fluid pressure operated while the other is mechanically operated, the latter control serving as a brake adjustment effective to maintain a constant stroke of both controls.

It is still another object of the invention to provide a disc brake wherein the applying mechanism is axially floatable, so that the friction pads be able to follow any disc distortion without any operating trouble.

In the preferred embodiment of the invention which will be described, the brake is so mounted inside of the disc that an easy maintenance and replacement of the friction pads without dismantling of the hydraulic circuit is realized, the removal of the friction pads when the linings are worn out being effected through an opening cut in the part which drives the disc.

It is a further object of the invention to design a brake fulfilling the above requirements and which is reliable in operation, easy to manufacture and to assemble, and in which the linings' wear can be checked by visual inspection.

Other and advantageous features of the invention will become evident from the following descriptions when read in connection with the accompanying drawings, which show a preferred embodiment of the invention and form a part of the specification. In the drawings:

FIGURE 2 is a section on line 2—2 of FIGURE 1; and

FIGURE 3 is a section on line 3—3 of FIGURE 1.

Figure 1:
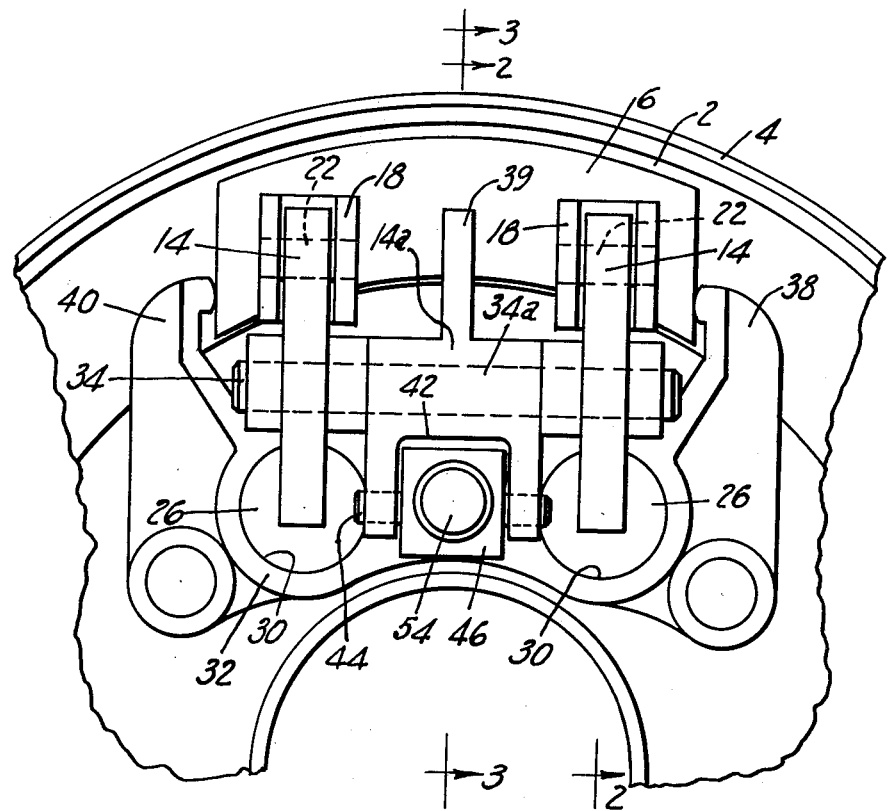
FIGURE 1 is an end view of a preferred embodiment of the invention comprising hydraulic and mechanical control.

The figures show an annular disc 2 driven by its outer periphery by a cup-shaped driving member connected to a wheel rim for instance. The brake, located inside the disc, includes two friction pads 6 and 8 each comprising a friction lining 10 bonded or riveted on a supporting plate 12. The friction pads are borne and applied by one or several pairs of rocking arms, according to the thrust it is necessary to exert thereon. If there is one pair of rocking arms, they are placed substantially in the plane of symmetry of the pads. If several pairs of rocking arms are used, they are regularly distributed along the friction pads.

FIGURE 1 shows an embodiment including two pairs of rocking arms symmetrically placed on the friction pad. The apertured upper ends of the rocking arms 14 and 16 are engaged in forks 18 and 20 fixed to the supporting plate and are rotatably connected to the forks by axle pins 22 and 24. The opposite end portions of the two rocking arms associated with a pad bear against pistons 26 and 28 reciprocably received in two parallel cylinders 30 machined in a fixed housing 32 or press mounted therein. The fixed housing is secured to a fixed part of the vehicle such as a bearing case for instance. The intermediate portions of the rocking arms are pivotally mounted through pivots 34 and 36 on apertured bosses of the cylinder.

The described embodiment is given as an example only and can of course be modified; for instance the disc can be driven by its inner periphery, the friction assembly being mounted outside of the disc on the vehicle frame. The shown embodiment is more particularly adapted to heavy vehicles while the other embodiment is more adapted to light vehicles where a low diameter disc is sufficient or to vehicles where place is available to locate the brake outside the disc. Besides, though the brake has been shown associated with a parking mechanism, it should be understood that it is equally applicable to front wheels.

The rocking arms are mounted on the friction pads through connections having a lost motion in the peripheral sense so that the pads, when they are shifted by the disc, come into abutment against either of anchoring lugs 38 and 40 mounted on the fixed housing 32 or integral therewith; the lugs should be located and dimensioned so that the abutment of the supporting plate be insured against them whatever be the wear of the lining; preferably the lugs attachment to the housing should not be axially offset with respect to the abutment to prevent them from being submitted to transversal flexure stresses.

The surfaces of the pads which abut the anchoring lug are preferably located to be traversed by the shifting force exerted on the pads by the disc, because any offset of the force with respect to this abutment would tend to pivot the pad about it and the corresponding moment would have to be taken by the applying mechanism.

The brake according to the invention improves upon the former devices of the same type in that the parts which take the applying force and the anchoring forces are wholly distinct. On one hand, the peripheral forces (anchoring forces) are taken by the anchoring lugs which directly transmit them to the frame. On the other hand, the friction pad weight is taken by the rocking arms through the pivot 34 or 36 and the applying force is delivered by the piston actuated by pressurized fluid. The offset of the friction pads weight with respect to the pins 22 and 24 is balanced by the compression of spring 41 located between the pads and the rocking arms.

The pivotal connections between the friction pads and the rocking arms enable the linings to take any vertical wearing shape without risk of jamming. Nevertheless, the point or points of application of the applying forces on the pads should preferably be determined taking into account the difference between the linear speeds along the disc radius and even, in a lesser way, taking into account the offset of the shifting thrust exerted by the disc on the pads with respect to the lugs, so as to obtain an even wear of the lining. The determination of the proper application point is shown and claimed in U.S. application Ser. No. 609,222 in the name of Jean Ruet, now Patent No. 2,937,722, granted May 24, 1960.

It is interesting to note that the whole friction assembly is axially floatable, the pistons located in a same cylinder being able to shift freely as a whole so as for instance to compensate any wear differential between the two linings.

Where a mechanical control (parking brake) is necessary, it is preferably associated with the fluid pressure control according to the arrangement of FIGS. 1 and 3. It its to be noted that the main control is not changed in any way in that arrangement so that it is possible to fit a mechanical control only in one amongst several brakes cooperating with a same disc.

The mechanical control comprises a pair of rocking arms 14A, 16A each pivoted on a pin 34A, 36A which can be integral with the pin on which pivot both rocking arms of the hydraulic control. Each rocking arm has a cam end portion which abuts the corresponding friction pad at the level which contains the axle pins about which the hydraulic rocking arms pivot on the pads; the pads are thus free to oscillate in a vertical plane, as already described.

Each mechanical rocking arm has a lower bifurcated end portion 42. Each furcation has two lugs which straddle one of the ears 44 borne by a nut 46 or 48 screwed on a threaded portion of a threaded strut 54. The furcations maintain the nuts against rotation, but let them free to move in an axial direction for rotating the rocking arms about pivots 34A and 36A. The threads 50—52 of the actuating strut are respectively right and left hand so that rotation of the strut in a predetermined direction spreads apart the nuts 46—48; the rocking arms 14A, 16A are then rotated counterclockwise and clockwise respectively and urge the pads against the disc. The strut 54 is free to move axially in an opening 55 of the fixed housing so that the assembly remains floatable in an axial direction.

The strut 54 is rotatable by a lever 56 which is connected to the strut through the abutment of cooperating serrated shoulders formed on the lever and strut; a tighting nut 60 maintains the lever and the strut secured together. Manual adjustment of the normal distance of the friction pads is readily effected by unscrewing the nut 60, rotating the lever a predetermined amount and tightening again the nut.

When the linings are worn out, the friction pads can be removed and replaced by removing the axle pins 22 and 24 which maintain the rocking arms between the forks; pad 8 can be directly removed while pad 10 should be shifted through an opening 62 provided in the cup-shaped driving member 4.

The brake operation is as follows:

When a master cylinder connected to the wheel cylinders is operated, the fluid pressure communicated to the cylinder or cylinders 30 exerts on the pistons forces which bias apart the pistons 26—28 and, through the rocking arms 14 and 16, squeezes the disc between the friction pads 6 and 8. The shifting thrust exerted by the disc on each pad is transmitted to that anchoring lug on which the pad abuts. If, during application of the brake, there appears a wear differential between the two linings (if for instance the two faces of the disc have different roughness coefficient) it is compensated by the floating mounting.

As soon as the pressure in the hydraulic cylinders is released, the rocking arms do not maintain the pads against the disc any longer. Preferably the pads are resilient so that their remaining contact with the disc is limited to their outer edge. This disposition is shown and claimed in the U.S. application Serial No. 680,782 filed August 28, 1957, in the name of the same applicants and will not be described again. But conventional return springs, not shown on the present figures, can equally be provided to bring back the pads into abutment against the mechanical rocking arms 14A and 16A which fix the normal clearance of the brake.

Mechanical application of the brake is effected in the same way by rotation of the applying lever 56 and a further description is accordingly useless. But it should be noted that hydraulic application of the brake does not result in any movement of the mechanical control, thereby the friction forces are reduced to a lesser value and the control is made easier.

While only one specific embodiment of the invention has been described in detail, it will be understood that changes might occur without departing from the spirit of the invention and such changes, as would fall within the skill of those expert in the art, are intended to be covered by the following claims.

What we claim is:

1. A disk brake assembly including an annular driven disk having oppositely facing flat friction surfaces, a brake mechanism having a fixed housing straddling a portion of said disk, a pair of oppositely acting friction members adapted to be axially applied against said friction surfaces, said friction members covering only an angular portion of said disk, fluid pressure motor means provided in said housing, coaxial pistons received in said pressure motor means, connections between said friction members and said pistons enabling said friction members to pivot and to shift slightly in a peripheral direction, anchoring means forming an integral part of said housing and extending closely to the friction surfaces of said disk, cooperating surfaces on the lateral end faces of said friction members and on said anchoring means forming a guide for said friction members during axial sliding engagement with the anchoring means and transmitting the peripheral shifting thrust exerted by said disk on said friction members against said anchoring means, said cooperating surfaces being located for traversal by the resultant shifting force exerted by the disk on said friction members whereby said friction members are relieved of pivoting torque, and a plurality of rocking arms pivotally mounted on said housing, each pair of rocking arms being associated with a pair of coaxial pistons mounted in said cylinder, a pivotal connection between each rocking arm and corresponding friction member, and a spring compressed between each friction member and the corresponding rocking arm and adapted to transmit the force due to the offset of the friction member weight with respect to said pivotal connection.

2. A disc brake assembly including a rotor having oppositely facing friction surfaces, a brake mechanism having a fixed housing straddling a portion of said rotor, a pair of oppositely acting friction members adapted to be axially applied against said friction surfaces, said friction members covering only an angular portion of said rotor, fluid pressure motor means provided in said housing, coaxial pistons received in said pressure motor means, rocking arms interconnecting each friction member with a respective piston, each of said rocking arms having one end operatively connected to one of said pistons and the other end pivotally connected to one of said friction members, each of said rocking arms further being pivotally connected intermediate the ends thereof to said housing, the pivotal connection between each of said rocking arms and the friction members being constructed to allow said friction members to shift slightly in a peripheral direction, anchoring projections extending from said housing and being closely adjacent said friction surfaces and contiguous the end lateral faces of said friction members, said anchoring projections being constructed so they will be engaged only by the lateral end faces of said friction members, cooperating surfaces on the lateral faces of said friction members and on said anchoring means forming a guide for said friction members during axial sliding engagement and receiving the peripheral shifting thrust exerted by said rotor on said friction members upon their application against the friction surfaces of said rotor.

3. The structure as recited in claim 2 wherein said rotor is driven by a cup-shaped driving member which is connected to the outer periphery of said rotor, said driving member having radial openings therein at least the size of said friction members for removal of said friction members.

4. The structure as recited in claim 2 wherein spring means are compressed between each friction member and each rocking arm for balancing the weight of each friction member due to the offset of each friction member with respect to the pivotal connection therebetween.

5. A disc brake assembly including a rotor having oppositely facing friction surfaces, a brake mechanism having a fixed housing straddling a portion of said rotor, a pair of oppositely acting friction members adapted to be axially applied against said friction surfaces, said friction members covering only an angular portion of said rotor, said housing having actuating means for applying said friction members, rocking arms interconnecting each friction member with said actuating means, each of said rocking arms having one end operatively connected to said actuating means and the other end pivotally connected to one of said friction members, each of said rocking arms further being pivotally connected intermediate the ends thereof to said housing, the pivotal connection between each of said rocking arms and the friction members being constructed to allow said friction members to shift slightly in a peripheral direction, anchoring projections extending from said housing and being closely adjacent said friction surfaces and contiguous the end lateral faces of said friction members, said anchoring projections being constructed so they will be engaged only by the lateral end faces of said friction members, cooperating surfaces on the lateral faces of said friction members and on said anchoring means forming a guide for said friction members during axial sliding engagement and receiving the peripheral shifting thrust exerted by said rotor on said friction members upon their application against the friction surfaces of said rotor.

6. The structure as recited in claim 5 wherein said rotor is driven by a cup-shaped driving member which is connected to the outer periphery of said rotor, said driving member having radial openings therein at least the size of said friction members for removal of said friction members.

7. The structure as recited in claim 5 wherein spring means are compressed between each friction member and each rocking arm for balancing the weight of each friction member due to the offset of each friction member with respect to the pivotal connection therebetween.

8. A disc brake as set forth in claim 5 wherein said cooperating surfaces are located so as to be traversed by the resultant shifting force exerted by the rotor on the friction members, whereby no pivoting torque is exerted on the members.

9. A disc brake assembly including a rotor having oppositely facing friction surfaces, a brake mechanism having a fixed housing straddling a portion of said rotor, a pair of oppositely acting friction members adapted to be axially applied against said friction surfaces, said friction members covering only an angular portion of said rotor, said housing having actuating means for applying said friction members, rocking arms interconnecting each friction member with said actuating means, each of said rocking arms having one end operatively connected to said actuating means and the other end pivotally connected to one of said friction members, each of said rocking arms further being pivotally connected intermediate the ends thereof to said housing, the pivotal connection between each of said rocking arms and the friction members being constructed to allow said friction members to shift slightly in a peripheral direction, spring means compressed between each friction member and each rocking arm for balancing the weight of each friction member due to the offset of each friction member with respect to the pivotal connection therebetween, anchoring projections extending from said housing and being closely adjacent said friction surfaces and contiguous the end lateral faces of said friction members, cooperating surfaces on the lateral faces of said friction members and on said anchoring means forming a guide for said friction members during axial sliding engagement and receiving the peripheral shifting thrust exerted by said rotor on said friction members upon their application against the friction surfaces of said rotor.

10. A disc brake assembly including a rotor having oppositely facing friction surfaces, a brake mechanism having a fixed housing straddling a portion of said rotor, a pair of oppositely acting friction members adapted to be axially applied against said friction surfaces, said friction members covering only an angular portion of said rotor, said housing having actuating means for applying said friction members, rocking arms interconnecting each friction member with said actuating means, each of said rocking arms having one end operatively connected to said actuating means and the other end pivotally connected to one of said friction members, each of said rocking arms further being pivotally connected intermediate the ends thereof to said housing, the pivotal connection between each of said rocking arms and the friction members being constructed to allow said friction members to shift slightly in a peripheral direction, anchoring projections extending from said housing and being closely adjacent said friction surfaces and contiguous the end lateral faces of said friction members, said anchoring projections being constructed so they will be engaged only by the lateral end faces of said friction members, cooperating surfaces on the lateral faces of said friction members and on said anchoring projections, means forming a guide for said friction members during axial sliding engagement and receiving the peripheral shifting thrust exerted by said rotor on said friction members upon their application against the friction surfaces of said rotor, said friction members being so arranged with respect to said anchoring projections and said rocking arms so that said rocking arms support the full weight of said friction members.

References Cited in the file of this patent

UNITED STATES PATENTS

| | | |
|---|---|---|
| 2,115,083 | Pierce | Apr. 26, 1938 |
| 2,324,979 | Hatch | July 20, 1943 |
| 2,399,010 | Eksergian et al. | Apr. 23, 1946 |
| 2,400,673 | Williams | May 21, 1946 |
| 2,633,941 | Zindler | Apr. 7, 1953 |
| 2,655,227 | Eksergian | Oct. 13, 1953 |
| 2,672,956 | Webb et al. | Mar. 23, 1954 |
| 2,701,626 | Walther | Feb. 8, 1955 |

FOREIGN PATENTS

| | | |
|---|---|---|
| 112,235 | Austria | Sept. 15, 1928 |

OTHER REFERENCES

Klaue, German Application, Serial No. k20,863, printed August 23, 1956.